United States Patent [19]

Miyosawa

[11] 4,016,129
[45] Apr. 5, 1977

[54] HARDENABLE COATING COMPOSITION

[75] Inventor: Yoshiaki Miyosawa, Hiratsuka, Japan

[73] Assignee: Kansai Paint Company, Ltd., Amagasaki, Japan

[22] Filed: July 29, 1975

[21] Appl. No.: 600,092

[30] Foreign Application Priority Data

July 30, 1974 Japan ............................ 49-4986590
July 30, 1974 Japan ............................ 49-4986591
July 30, 1974 Japan ............................ 49-4986592

[52] U.S. Cl. .................. 260/29.6 B; 260/29.6 BM; 428/446
[51] Int. Cl.² ........................................ C08L 43/04
[58] Field of Search ............. 260/29.6 B, 29.6 BM, 260/42.51, 42.55, 42.26

[56] References Cited

UNITED STATES PATENTS

| 2,162,618 | 6/1939 | Izard ......................... 260/29.6 BM |
| 2,833,661 | 5/1958 | Iler ........................................ 260/42.51 |
| 3,738,957 | 6/1973 | Iler ........................................ 260/42.51 |
| 3,773,776 | 11/1973 | Iler ........................................ 260/29.6 B |
| 3,896,079 | 7/1975 | Boissieras et al. ............... 260/42.26 |

Primary Examiner—M. J. Welsh
Attorney, Agent, or Firm—Ostrolenk, Faber, Gerb & Soffen

[57] ABSTRACT

A hardenable coating composition which forms an excellent coating film having good properties of transparency, flexibility, hardness and noncombustibility and comprises an aqueous dispersion of silica-polyvinyl alcohol complex prepared by the reaction between colloidal silica dispersion and polyvinyl alcohol solution at a temperature above 50° C. Said reaction can be accelerated by accelerators di- or tri-alkoxy silane accelerators and the properties of the obtained coating film can be improved by the addition of curing agents such as alkoxides and water soluble metallic salts.

12 Claims, No Drawings

HARDENABLE COATING COMPOSITION

BACKGROUND OF THE INVENTION

This invention relates to a hardenable coating composition which comprises, as the principal component, an aqueous dispersion of silica-polyvinyl alcohol complex. More particularly, the invention relates to a hardenable coating composition which forms an excellent coating film having desirable properties such as transparency, water resistance, mechanical properties, flexibility and noncombustibility. Further, this invention relates to a hardenable coating composition of silica-polyvinyl alcohol complex dispersion which contains alkoxy silanes as a reaction accelerator. Furthermore, this invention relates to a hardenable coating composition of silica-polyvinyl alcohol complex dispersion in which the properties of coating film to be formed can be improved by the addition of curing agents such as alkoxides, complexes, water soluble metallic salts and coordination compounds.

In order to produce a novel industrial material to form coating film having the good adhesion, covering property and flexibility characteristic of organic polymers and hardness and the noncombustibility characteristic of inorganic materials, the present inventors have carried out eager and extensive studies on a wide variety of raw material. As the result of experiments, the inventors have discovered that silica (silicon dioxide or silicic acid anhydride) combines easily with organic polymers containing hydroxy groups, especially with polyvinyl alcohols under specific reaction conditions to form silica-polyvinyl alcohol complex. Further, it has been also found that this silica-polyvinyl alcohol complex meets the above-mentioned requirements. Furthermore, in accordance with the additional experiments, it has been found that the reaction to form the silica-polyvinyl alcohol complex can be promoted by the addition of a certain compound, and the curing and film properties of obtained film can be much improved by the addition of curing agents to the coating composition.

Thereby the present invention on the hardenable coating composition has been accomplished.

BRIEF SUMMARY OF THE INVENTION

Accordingly, it is an object of the present invention to provide a novel hardenable coating composition which contains the above-mentioned silica-polyvinyl alcohol complex as the principal component.

It is another object of the present invention to provide a hardenable coating composition which forms coating films having excellent properties.

It is a further object of the present invention to provide a hardenable coating composition containing silica-polyvinyl alcohol complex and reaction accelerators.

It is still a further object of the present invention to provide a hardenable coating composition containing silica-polyvinyl alcohol complex and curing agents for curing the coating film in a short time and forming the coating film with improved properties.

In accordance with the present invention, the coating composition is prepared by dispersing silica particles of 7 to 100 m$\mu$ in average particle diameter into an aqueous solution of polyvinyl alcohol and the mixture is then heated to 50° C or higher. The reaction between the silica and polyvinyl alcohol can be accelerated by the addition of certain reaction accelerators such as di- or tri-alkoxy (or alkoxyalkoxy) silanes.

Further, according to another aspect of the present invention, the properties of the coating film formed by the composition of this invention can be very much improved by the addition of curing agents to the coating composition. Thus, the obtained film has a fine texture and excellent corrosion resistance. As such curing agents, alkoxides of the group IV elements of the periodic table, complexes of the same elements, water soluble salts of copper, zinc, aluminum, zirconium, chromium, cobalt and nickel or their coordination compounds, and boric acid, borates, chromic acid, chromates and bichromates may be exemplified.

Other and further objects, features and advantages of the present invention will appear more fully from the following description.

DETAILED DESCRIPTION OF THE INVENTION

The silica for producing the silica-polyvinyl alcohol complex of the present invention is what is called colloidal silica commonly supplied in the form of aqueous dispersion. The average particle diameter of the silica is 7 to 100 m$\mu$, and preferably 10 to 50 m$\mu$. When the particle diameter of the silica material is less than 7 m$\mu$, the stability of the particles becomes poor, and consequently a stable and homogeneous complex can not be produced. On the other hand, when the particle diameter is larger than 100 m$\mu$, the reaction between the silica and polyvinyl alcohol does not sufficiently proceed because the total surface area of silica particles becomes smaller. Further, the transparency of the obtained silica-polyvinyl alcohol complex is not good and, when coating films are formed from such complex, the mechanical properties such as flexibility and impact resistance of films becomes poor. Therefore, when the silica particles having average particle diameter of less than 7 m$\mu$ or more than 100 m$\mu$ are used, the silica-polyvinyl alcohol complex having a wide variety of utility can not be produced.

As mentioned in the above, the colloidal silica used for the present invention is generally supplied in the form of aqueous dispersion and both an acid dispersion and alkaline dispersion may be used. In view of reactivity an, unstable dispersion (pH = 3 – 4) is most preferable, however, the stable dispersion (pH = 8 – 10) prepared by the addition of alkali metal ions such as sodium ion or ammonium ions may also be used in the present invention.

The above-mentioned polyvinyl alcohol for the preparation of silica-polyvinyl alcohol complex is generally the hydrolysis product of polyvinyl ester having a number average polymerization degree of 500 to 2400 and the saponified component in the polyvinyl alcohol is preferably 70% weight or more. In case the ratio of saponified component is less than 70% by weight in the polyvinyl alcohol, the silica particles can not be uniformly dispersed in the aqueous solution of said polyvinyl alcohol and therefore, the reaction for producing the silica-polyvinyl alcohol complex can not be smoothly carried out.

The compounding ratio of silica/polyvinyl alcohol is 25/75 to 75/25 by weight as solid content and preferably 40/60 to 70/30. In case the ratio of silica is less than 25% by weight, the characteristic features of silica such as noncombustibility and hardness of the final product can not be expected. When the ratio of silica is more than 75% by weight on the other hand, the transparency of the final product becomes insufficient and the characteristic features of organic polymer, for example, the flexibility and continuity in a film form, become poor, and therefore useful silica-polyvinyl alcohol complex can not be obtained.

The solid content of the mixture of the above two components in the above-defined ratio is to be adjusted in the range of 10 to 40% by weight and the mixture is then allowed to react.

In the preparation of silica-polyvinyl alcohol complex from silica and polyvinyl alcohol, both materials in the form of aqueous dispersion or aqueous solution are well mixed and heated at a temperature in the range of 50° C to the boiling point of the mixture, and preferably in the range of 70° to 90° C.

When the reaction mixture is heated at a temperature lower than 50° C, the reaction between the silica and polyvinyl alcohol is very slow, so that the complex having good film forming property can not be produced. When the heating of the reaction mixture is continued in the above temperature range, the viscosity of the reaction mixture increases gradually and the viscosity eventually approaches a constant value which is the final point of the reaction to discontinue the heating. This reaction time to the final point is usually 2 to 5 hours.

The reaction time for producing the silica-polyvinyl alcohol complex can be very much reduced by the addition of reaction accelerators and the proportion of reaction can be increased. That is, the water soluble di- or tri-alkoxy (or alkoxyalkoxy) silanes are useful as the reaction accelerators for the preparation of the silica-polyvinyl alcohol complex and by using the accelerators, the above reaction time can be reduced to 0.5 to 2 hours at the same reaction temperature. The water soluble di- or tri- alkoxy (or alkoxyalkoxy) silanes can be represented by the following general formula:

(1) CH₂=CHSi(OR)₃ or CH₂=CHSi(OCH₂CH₂OR)₃

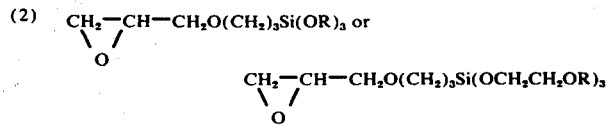

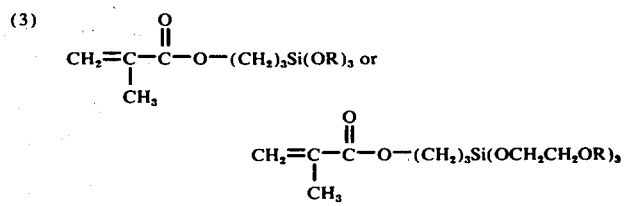

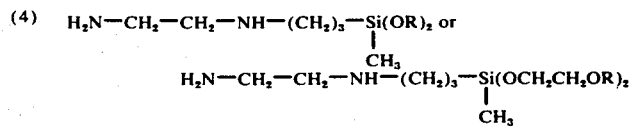

(5) H₂N—CH₂—CH₂—NH—(CH₂)₃—Si(OR)₃ or

H₂N—CH₂—CH₂—NH—(CH₂)₃—Si(OCH₂CH₂OR)₃

(6) H₂N—(CH₂)₃Si(OR)₃ or H₂N—(CH₂)₃—Si(OCH₂CH₂OR)₃ wherein R is alkyl group having 1 to 5 carbon atoms. It is necessary to select the alkoxy silanes according to the property, acid or alkaline, of the aqueous dispersion of silica. For acid dispersion of colloidal silica, the following compounds can be exemplified:

Vinyl tris-β-methoxyethoxy silane
CH₂=CHSi(OCH₂CH₂OCH₃)₃
γ-glycidopropyl trimethoxy silane

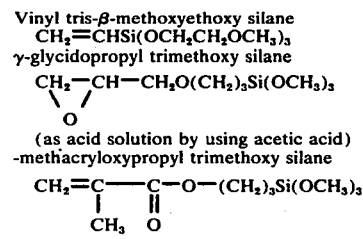

(as acid solution by using acetic acid)
-methacryloxypropyl trimethoxy silane

CH₂=C—C—O—(CH₂)₃Si(OCH₃)₃
    |   ‖
    CH₃ O

Further, for alkaline dispersion of colloidal silica, the following compounds having basic function groups can be used:

N-(β-aminoethyl)-γ-aminopropyl methyl dimethoxy silane

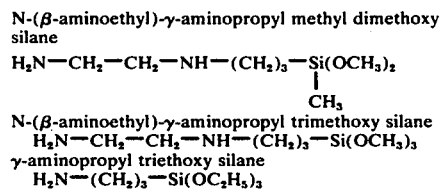

N-(β-aminoethyl)-γ-aminopropyl trimethoxy silane
H₂N—CH₂—CH₂—NH—(CH₂)₃—Si(OCH₃)₃
γ-aminopropyl triethoxy silane
H₂N—(CH₂)₃—Si(OC₂H₅)₃

The quantity of use of these alkoxy silanes is generally 1 to 15% by weight, and preferably 3 to 10% by weight to the total weight as solid of both silica and polyvinyl alcohol. When less than 1% by weight is used the reaction accelerating effect and viscosity increasing effect are not distinct and when more than 15% by weight of the accelerator is used, the effect of addition does not increase as compared with the addition of 15% by weight.

The mechanism of chemical reaction caused in the heating of the aqueous dispersion of silica and polyvinyl alcohol has not been clarified yet. If the aqueous dispersion of silica and aqueous solution of polyvinyl alcohol are heated separately, no increases of viscosity is observed. In the present invention, the mixture is heated so that the increase of viscosity is caused to occur. When the reaction accelerator is used, the increase of viscosity becomes larger. Therefore, it is considered that a dehydration condensation reaction between the silanolic OH-groups on the surface of silica particles and alcoholic OH-groups of the polyvinyl alcohol occurs to produce covalent bonds of

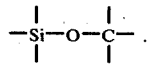

Further, the mechanism of the above-mentioned alkoxy silane as a reaction accelerator is not evident, however taking the following facts into consideration that the viscosity of aqueous dispersion of silica increases only slightly when alkoxy silane is added and heated, and the viscosity of polyvinyl alcohol aqueous solution does not increase by the addition of alkoxy silane with heating, it is supposed that the alkoxy silane may activate silica and accelerate the reaction between silica and polyvinyl alcohol.

Still further, when polyvinyl alcohol is added to silica in the unstable range of pH 6 to 7, the gelation of mixture takes place, while if the mixture is heated, the gelation or aggregation does not occur, so that it is supposed that some connection between the silica and polyvinyl alcohol may be formed.

In the present invention, the curing property of the coating composition of silica-polyvinyl alcohol complex can be improved by the addition of curing agents. In addition to the improvement of curing property, the flexibility and water resistance of the coating film may also be improved by the addition of curing agent.

The above-mentioned curing agents for the coating composition of the present invention are alkoxides of the group IV elements of the periodic table or their complexes, water soluble metallic salts or coordination compounds of such metals, and inorganic acids or their salts.

When the above curing agent is used for the coating composition of the present invention, a dense network structure of the polymer is formed and the remaining free silanolic hydroxyl groups on the surface of silica are decreased, and thus the properties for example, water resistance and fixibility of obtained coating film can be improved.

In the following, the curing agent for the coating composition of the present invention will be exemplified:

A. Alkoxides of the group IV elements in the periodic table and their complexes i. Tetraalkoxides represented by the general formula:

in which M is silicon (Si), titanium (Ti), zirconium (Zr), hafnium (Hf) or thorium (Th) and R is an alkyl group having 1 to 8 carbon atoms such as methyl, ethyl, n-propyl, isopropyl, n-butyl, isobutyl, sec-butyl, tert-butyl, n-pentyl, isopentyl, n-hexyl, n-heptyl or n-octyl group. Further, the dimers to decamers obtained by condensing the above tetraalkoxides can also be used.

ii. Trialkoxides represented by the general formula:

in which M and R are the same as those in the foregoing formula for tetraalkoxides and R' is a substituent group of ethyl, amyl, phenyl, vinyl, $\beta$-(3,4-epoxycyclohexyl), $\gamma$-mercaptopropyl, $\gamma$-aminopropyl, or N-$\beta$-(aminoethyl) group. In these trialkoxides, it is preferably that the symbol M is silicon.

iii. Complexes of alkoxides (i) and (ii) prepared by combining the alkoxides with compounds such as maleic acid, lactic acid, tartaric acid, ethylene glycol, diacetone alcohol, acetylacetone, salicylic acid, catechol and pyrogallol which have a tendency to form a coordination compound.

B. Water soluble metallic salts and their coordination compounds i. Water soluble copper salts and coordination compounds:

Cupric chloride ($CuCl_2$ or $CuCl_2 \cdot 2H_2O$), cupric bromide ($CuBr_2$), ammonium cupric chloride ($CuCl_2 \cdot 2NH_4Cl \cdot 2H_2O$), potassium cupric chloride ($CuCl_2 \cdot 2KCl \cdot 2H_2O$), copper nitrate ($Cu(NO_3)_2 \cdot 3H_2O$ or $Cu(NO_3)_2 \cdot 6H_2O$), copper sulfate ($CuSO_4$ or $CuSO_4 \cdot 5H_2O$), copper bichromate ($CuCr_2O_7 \cdot 2H_2O$), copper formate ($Cu(CHO_2)_2$), copper acetate ($Cu(CH_3COO)_2 \cdot H_2O$), copper lactate ($Cu(C_3H_5O_3)_2 \cdot 2H_2O$), copper phenolsulfonate ($[C_6H_4(OH)SO_3]_2Cu \cdot 6H_2O$), copper gluconate ($Cu(C_6H_{11}O_7)_2 \cdot H_2O$), ethylenediaminetetraacetic acid copper complex and nitrilotriacetic acid copper complex.

ii. Water soluble zinc salts and coordination compounds:

Zinc chloride ($ZnCl_2$), zinc bromide ($ZnBr_2$), zinc iodide ($ZnI_2$), zinc thiocyanate ($Zn(CNS)_2$), ammonium zinc chloride ($ZnCl_2 \cdot 2NH_4Cl$), zinc nitrate ($Zn(NO_3)_2 \cdot 6H_2O$), zinc sulfate ($ZnSO_4$ or $ZnSO_4 \cdot 7H_2O$), ammonium zinc sulfate ($ZnSO_4 \cdot (NH_4)_2SO_4 \cdot 6H_2O$), zinc formate ($Zn(CHO_2)_2 \cdot 2H_2O$), zinc acetate ($Zn(C_2H_3O_2)_2 \cdot 2H_2O$), zinc lactate ($Zn(C_3H_5O_3)_2 \cdot 3H_2O$), zinc phenolsulfonate ($Zn[C_6H_4(OH)SO_3]_2 \cdot 8H_2O$) zinc salicylate ($Zn(C_6H_4(OH)COO]_2 \cdot 3H_2O$), ethylenediaminetetraacetic acid zinc complex and nitrotriacetic acid zinc complex.

iii. Water soluble aluminum salts and coordination compounds:

Aluminum chloride ($AlCl_3 \cdot 6H_2O$), aluminum bromide ($AlBr_3$), aluminum iodide ($AlI_3$), alminum thiocyanate ($Al(SCN)_3$), sodium aluminum chloride ($AlCl_3 \cdot NaCl$), aluminum nitrate ($Al(NO_3)_3 \cdot 9H_2O$), aluminum sulfate ($Al_2(SO_4)_3$ or $Al_2(SO_4)_3 \cdot 18H_2O$) ammonium aluminum chloride ($AlCl_3 \cdot NH_4Cl$), ammonium aluminum sulfate ($Al_2(SO_4)_3(NH_4)_2SO_4 \cdot 24H_2O$), potassium aluminum sulfate ($Al_2(SO_4)_3 \cdot K_2SO_4 \cdot 24H_2O$), aluminum formate ($Al(OH)(CHO_2)_2 \cdot H_2O$), aluminum phenolsulfonate ($Al[C_6H_4(OH)SO_3]_3$, ethylenediaminetetraacetic acid aluminum complex and nitrilotriacetic acid aluminum complex.

iv. Water soluble zirconium salts and coordination compounds:

Zirconium nitrate ($Zr(NO_3)_4 \cdot 5H_2O$), zirconium sulfate ($Zr(SO_4)_2 \cdot 3H_2O$), basic zirconium acetate ($Zr(C_2H_3O_2)_3OH$), zirconium acetylacetonate ($Zr(CH_2COCH_2COCH_3)_4$), ethylenediaminetetraacetic acid zirconium complex, nitrilotriacetic acid zirconium complex, zirconyl chloride ($ZrOCl_2 \cdot 8H_2O$), Zirconyl nitrate ($ZrO(NO_3)_2 \cdot 2H_2O$) and other zirconyl salts.

v. Water soluble chromium salts and coordination compounds:

Chronium chloride ($CrCl_3$), chromium nitrate ($Cr(NO_3)_3 \cdot 9H_2O$), chromium sulfate ($Cr_2(SO_4)_3 \cdot 15H_2O$ or $Cr_2(SO_4)_3 \cdot 18H_2O$), ammonium chromium sulfate ($CrNH_4(SO_4)_2 \cdot 12H_2O$), potassium chromium sulfate ($CrK(SO_4)_2 \cdot 12H_2O$), ethylenediaminetetraacetic acid chromium complex and nitrilotriacetic acid chromium complex.

vi. Water soluble cobalt salts and coordination compounds:

Cobalt chloride ($CoCl_2$ or $CoCl_2 \cdot 6H_2O$), cobalt bromide ($CoBr_2 \cdot 6H_2O$), cobalt iodide ($CoI_2 \cdot 6H_2O$), cobalt nitrate ($Co(NO_3)_2 \cdot 6H_2O$), cobalt sulfate ($CoSO_4$ or $CoSO_4 \cdot 7H_2O$), cobalt acetate ($Co(C_2H_3O_2)_2 \cdot 4H_2O$), ammonium cobalt sulfate ($CoSO_4 \cdot (NH_4)_2SO_4 \cdot 6H_2O$), ethylenediaminetetraacetic acid cobalt complex and nitrilotriacetic acid cobalt complex.

vii. Water soluble nickel salts and coordination compounds:

Nickel chloride ($NiCl_2$ or $NiCl_2 \cdot 6H_2O$), nickel bromide ($NiBr_2$ or $NiBr_2 \cdot 3H_2O$), nickel iodide ($NiI_2$ or $NiI_2 \cdot 6H_2O$), nickel nitrate ($Ni(NO_3)2 \cdot 6H_2O$), nickel sulfate ($NiSO_4 \cdot 6H_2O$ or $NiSO4 \cdot 7H_2O$), ammonium nickel chloride ($NiCl_2 \cdot NH_4Cl \cdot 6H_2O$), ammonium nickel sulfate ($NiSO_4 \cdot (NH_4)_2SO_4 \cdot 6H_2O$), nickel formate ($Ni(HCOO)_2 \cdot 2H_2O$), nickel acetate ($Ni(CH_3COO)_2 \cdot 4H_2O$), ethylenediaminetetraacetic acid nickel complex and nitrilotriacetic acid nickel complex.

C. Inorganic acids and their salts i. Boric acid and its water soluble salts:

Boric acid ($H_3BO_3$), sodium metaborate ($NaBO_2$ or $NaBO_2 \cdot 2H_2O$), potassium metaborate ($KBO_2$), sodium tetraborate ($Na_2B_4O_7 \cdot 10H_2O$), potassium tetraborate ($K_2B_4O_7 \cdot 5H_2O$), ammonium biborate ($NH_4HB_4O_7 \cdot 3H_2O$) and sodium perborate ($NaBO_2 \cdot H_2O_2 \cdot 3H_2O$).

ii. Chromic acid and water soluble chromates and bichromates:

Chromic anhydride ($CrO_3$), lithium chromate ($Li_2CrO_4 \cdot H_2O$), sodium chromate $Na_2CrO_4 \cdot 10H_2O$), potassium chromate ($K_2CrO_4$), ammonium chromate (($NH_4)_2CrO_4$), calcium chromate ($CaCrO_4 \cdot 2H_2O$), sodium bichromate ($Na_2Cr_2O_7 \cdot 2H_2O$), potassium bichromate ($K_2Cr_2O_7$) and ammonium bichromate (($NH_4)_2Cr_2O_7$).

The addition quantity of the above-mentioned alkoxides or their complexes is generally 3 to 20% by weight to the solid content of the coating composition of silica-polyvinyl alcohol complex. In case the coating composition contains the aforementioned reaction accelerator of alkoxy silane, the preferable addition range is 5 to 10% and when the accelerator is not used, the preferable range is 10 to 15%.

The addition quantity of the other curing agents of metallic salts, their coordination compounds, inorganic acids and their salts is 1 to 10% by weight to the solid content of the coating composition of silica-polyvinyl alcohol complex.

The above curing agents may be added solely or in a mixture of two or more unless they form a precipitate or agglomeration. When the curing agent less than the above range is used, a sufficient curing effect can not be expected; on the other hand, when curing agent more than the above range is used, the effect of the excess addition in the curing rate can not be obtained, and what is worse, the water resistance of obtained coating film is degraded and the stability of the coating composition is lowered owing to the coagulation.

When the above curing agent is added to the aqueous dispersion of silica-polyvinyl alcohol complex of the present invention to form a coating composition, the viscosity of the obtained composition generally becomes high, so that the viscosity may be adjusted by adding a proper amount of water in accordance with the method of coating. The coating composition of the present invention can be applied to the surfaces of various articles by means of any known coating method and after the coating, the volatile components in the coated film are allowed to evaporate. This film can be cured at room temperature, however, in order to reduce the curing time and improve the film properties, the coated film is preferably cured by heating at a temperature of 100° to 230° C for 5 to 60 minutes.

The above-mentioned silica-polyvinyl alcohol complex of the present invention has the advantages of both silica and polyvinyl alcohol, therefore it can be used for several purposes. Especially, the silica-polyvinyl alcohol complex is produced in the form of an aqueous dispersion, so that it can be used as the ordinary coating composition as it stands and the characteristics of noncombustibility, hardness and wear resistance of silica and flexibility and adherence of polyvinyl alcohol can be obtained simultaneously. In the conventional art, the noncombustible inorganic coating material of silicates lacks the flexibility and the flame-resistant coating material containing organic binders is opaque since it contains large amounts of dispersed components. According to the present invention, excellent coating film having transparency, flexibility and noncombustibility can be formed. Further, when the silica-polyvinyl alcohol complex of the present invention is used as noncombustible coating composition, the obtained coating film produces neither noxious gases nor flame at the decomposition temperature which is far superior to the conventional noncombustible coating materials such as fluororesin or other materials containing phosphorus compounds or chlorine compounds as flame retarders.

Furthermore, the coating film obtained from the coating composition of the present invention has an affinity for oil-base printing ink, therefore the coating material containing the above-mentioned curing agent (C - ii) such as bichromate can be used for forming the photo-sensitive layer on lithographic printing plate material.

The present invention will be further explained by way of example in the following.

EXAMPLE 1

A 1 liter three neck flask was fed with 250 g of "Snow Tex-O" (trademark of colloidal silica aqueous dispersion made by Nissan Chemical Industries, Ltd., Japan; particle diameter: 10 – 20 m$\mu$; $SiO_2$ content: 20 wt%; pH: 3 – 4) and 250 g of 20 wt% aqueous solution of polyvinyl alcohol (saponification value: about 88%; number average polymerization degree: 500) was then added dropwise to the above content for 30 minutes where the temperature was maintained at 80° C. After this addition, the stirring was continued for 3 hours at the same temperature to obtain a milky white aqueous dispersion of silica-polyvinyl alcohol complex of the present invention.

The viscosity of the reaction mixture after the dropping of polyvinyl alcohol solution was 2.1 poise (measured at 20° C by a Brookfield viscometer, the same shall apply hereinafter), however, it increased to 4.2 poise after the reaction.

EXAMPLE 2

The reaction between Snow Tex-O and polyvinyl alcohol (the same as that in Example 1, 20 wt% aqueous solution) was carried out in like manner as Example 1 using the same amounts of materials except that the reaction temperature was maintained at 52° C and the reaction was continued for 6 hours after the dropwise addition.

Through the above reaction, a dispersion of silicapolyvinyl alcohol complex of 3.7 poise in viscosity (20° C) having the similar appearance as the foregoing reaction product was obtained.

EXAMPLE 3

The procedure of as that in Example 1 was carried out in which the compounding ratio (weight ratio as solid contents) of Snow Tex-O to 20 wt% polyvinyl alcohol was 3 to 2, and the reaction was carried out at 80° C for 5 hours. During the reaction, the viscosity (20° C) of the reaction mixture was increased from 1.9 poise to 3.7 poise and a milky white dispersion of silica-polyvinyl alcohol complex was obtained.

EXAMPLE 4

A 1 liter three neck flask was fed with 300 g of the same polyvinyl alcohol aqueous solution as that in Example 1, and the temperature was raised to 80° C. Then, 200 g of Snow Tex-O was added dropwise thereto and the reaction was continued for further 5 hours at the same temperature. During this reaction, the viscosity (20° C) increased from 2.0 poise to 4.3 poise and a milky white aqueous dispersion of silica-polyvinyl alcohol complex was produced.

EXAMPLE 5

In place of Snow Tex-O used in Example 1, 250 g of Snow Tex-OL (trademark of colloidal silica aqueous dispersion made by Nissan Chemical Industries, Ltd.; particle diameter: about 45 m$\mu$; SiO$_2$ content: 20 wt%; pH: 3.4) was used, and the reaction was carried out in like manner as Example 1 by using the above Snow Tex-OL and 250 g of 20 wt% aqueous solution of polyvinyl alcohol (saponification value: 98 – 99%; number average polymerization degree: 1000). As the result, an opaque white aqueous dispersion of silica-polyvinyl alcohol complex was obtained. The viscosity (20° C) of the reaction mixture before the reaction was 2.0 poise and it increased to 4.2 poise during the reaction.

EXAMPLE 6

The reaction was carried out in like manner as Example 1 except that Snow Tex-C (trademark of aqueous alkaline stable dispersion of colloidal silica made by Nissan Chemical Industries, Ltd.; particle diameter: 10 – 20 m$\mu$; SiO$_2$ content: 20 wt%; pH: 8.8) was used in place of Snow-Tex-O and the reaction was carried out for 5 hours at 80° C. Thereby, a milky white aqueous dispersion of silica-polyvinyl alcohol complex having a viscosity of 3.5 poise (20° C) was obtained.

EXAMPLE 7

A 1 liter three neck flask was fed with 250 g of Snow Tex-O and heated to 80° C. Then, 5 g of vinyl tris($\beta$-methoxyethoxy)silane (made by The Shin-etsu Chemical Industry Co., Ltd., Japan; trademark: KBC 1003) was added dropwise and mixed for 30 minutes at the same temperature. Thereafter, 250 g of polyvinyl alcohol aqueous solution (the same as that in Example 1) was added dropwise for 10 minutes and the reaction was further continued for 2 hours at the same temperature. By the above reaction, a milky white aqueous dispersion of silica-polyvinyl alcohol complex having a high viscosity of more than 1000 poise was obtained.

EXAMPLE 8

The aqueous dispersion was prepared in like manner as Example 7 except that 15 g of vinyl tris($\beta$-methoxyethoxy) silane was used and the reaction was carried out for 1 hour at 55° C. As the result, a similar aqueous dispersion of silica-polyvinyl alcohol complex was obtained.

EXAMPLE 9

To 250 g of "Ludox AS" (trademark of ammoniacal stable colloidal silica dispersion made by E. I. du Pont de Nemours & Co., Inc., U.S.A.; particle diameter: 13 – 14 m$\mu$: SiO$_2$ content: 30 wt%; pH: 9.6) was added 4 g of N-($\beta$-aminoethyl)-$\gamma\gamma$-aminopropyl trimethoxy silane (trademark "A-1120" made by Union Carbide and Carbon Corp., U.S.A.). Then 250 g of polyvinyl alcohol aqueous solution used in Example 1 was added dropwise thereto for 20 minutes at the reaction temperature of 80° C. The reaction was further caused to proceed for 1 hour at the same temperature. Thus, a milky white aqueous dispersion of silica-polyvinyl alcohol complex having a viscosity of 540 poise (20° C) was obtained.

EXAMPLE 10

To 300 g of Snow Tex-N (trademark of amine-stable colloidal silica aqueous dispersion made by Nissan Chemical Industries, Ltd.; particle diameter: 10 – 20 m$\mu$; SiO$_2$ content: 20 wt%; pH: 9.4) was added 3 g of $\gamma$-aminopropyl triethoxy silane (made by Union Carbide and Carbon Corp., U.S.A.; trademark: A-1100). Then, 200 g of the same polyvinyl alcohol aqueous solution as that in Example 5 was added dropwise thereto for about 15 minutes at 80° C, and the reaction was further continued for 40 minutes at the same temperature to obtain a milky white aqueous dispersion of silica-polyvinyl alcohol complex having a viscosity of 320 poise (20° C).

EXAMPLE 11

A 1 liter three neck flask was fed with 300 g of the same polyvinyl alcohol aqueous solution as that in Example 1 and heated to 80° C. Then, 200 g of Snow Tex-C containing 10 g of vinyl tris($\beta$-methoxyethoxy) silane was added dropwise for 20 minutes to the above solution and the reaction was continued for further 1 hour at the same temperature. As the result, a milky white aqueous dispersion of silica-polyvinyl alcohol complex having a viscosity of 1000 poise (20° C) was obtained.

TESTS

The viscosities of the aqueous dispersions of silica-polyvinyl alcohol complexes of the foregoing Examples 1 to 11 were adjusted by adding water. The adjusted dispersions were then applied to the surfaces of 0.5 mm thick steel sheets by brushing to form a coating film of about 30 microns in thickness, while the test pieces for the burning resistance test were applied with about 50 micron thick coating film. These test pieces were then baked for curing at 160° C for 10 minutes to obtain coated test pieces. The cured coatings were all transparent and smooth with excellent gloss.

These test pieces were then subjected to film hardness test (pencil hardness), Erichsen film test, water resistance test, abrasion resistance test and burning resistance test, the results of which are shown in the following Table 1. By the way, bending tests were carried out in which the test pieces were bent on a rod of 1 mm in diameter and neither cracks nor defects were observed in any test pieces.

COMPARATIVE EXAMPLES 1 – 3

For comparison, similar test piece were likewise prepared by using the following materials and were subjected to similar tests.

COMPARATIVE EXAMPLE 1

The polyvinyl alcohol solution itself used in Example 5.

COMPARATIVE EXAMPLE 2

An incomplete silica-polyvinyl alcohol complex which was prepared by using the same raw materials as those in Example 1 and caused to react at 35° C for 8 hours.

COMPARATIVE EXAMPLE 3

An incomplete silica-polyvinyl alcohol complex which was prepared by using the same raw materials as those in Example 10 and caused to react at 35° C for 8 hours.

The results of the similar tests with regard to the test pieces of Comparative Examples are also shown in the following Table 1.

Table 1

| Example No. | Film hardness (Pencil hardness) (*1) | Erichsen film test (*2) | Water (*3) resistance | Abrasion (*4) resistance | Burning (*5) resistance |
| --- | --- | --- | --- | --- | --- |
| Example 1 | 6H | 100 | 60 hr | 20 mg | A-B |
| Example 2 | 5H | 100 | 60 " | 23 " | B |
| Example 3 | 7H | 98 | 72 " | 15 " | A |
| Example 4 | 4H | 100 | 60 " | 23 " | B |
| Example 5 | 7H | 100 | 72 " | 21 " | A |
| Example 6 | 6H | 100 | 60 " | 22 " | A-B |
| Example 7 | 8H | 100 | 120 " | 15 " | A |
| Example 8 | 9H | 100 | 120 " | 10 " | A |
| Example 9 | 8H | 100 | 96 " | 12 " | A |
| Example 10 | 9H | 97 | 96 " | 8 " | A |
| Example 11 | 7H | 100 | 72 " | 17 " | A-B |
| Comparative Example 1 | 2H | 100 | 12 " | 60 " | C |
| Comparative Example 2 | 4H | 100 | 24 " | 31 " | B-C |
| Comparative Example 3 | 5H | 94 | 48 " | 30 " | B |

Notes for Table 1
(*1) Film hardness (Pencil hardness):
After the specimen was left for 24 hours in a thermohygrostated chamber maintained at a temperature of 20 ± 1° C and a relative humidity of 20 ± 3%, it was set horizontally in the chamber and strongly scratched with a sharpened pencil. The value was expressed by the hardness of the hardest pencil which could not make any scratch on the coated surface.
(*2) Erichsen film test:
On the surface of the coating of the test piece, two sets of eleven notch lines having intervals of 1 mm, being perpendicular to each other and reaching the surface of the substrate were formed by a knife, thereby 100 of small squares were cut on the coating film. The test piece with said cross-cut pattern was then subjected to Erichsen film tester where the test piece was pressed down for 5 mm from the backside of the cut surface. The center of the cross-cut pattern and that of the deformation of the test piece was caused to coincide with each other. Thereafter, the cross-cut pattern was applied with self-adhesive tape of 20 mm in width and pressed down by hand to adhere tightly to the coating, the self-adhesive tape was then peeled off quickly, and the number of the square cuts remained on the test piece was counted.
(*3) Water resistance
Deionized water was put in a 300 ml beaker to the depth of 90 mm. The test piece of 70 mm in width and 130 mm in length coated on both sides was sealed on the peripheral edges by solid paraffin, and it was immersed into the water by hanging at 80 mm depth. The beaker was placed in a water bath at 20° C and the condition of the coating film was observed at every 12 hours. The longest time in which any defects such as dissolving, peeling and blistering was not observed, was indicated in the Table.
(*4) Abrasion resistance
Each test piece was weighed with a precision of 0.1 mg and fitted to the supporting table of a Taber abrasion tester. The friction wheel CS-10 with 500 g weights having an axle parallel to the coated surface was brought into contact with the coated surface of the test piece. The friction wheels were driven for 1000 turns while the dust was removed by suction. Then, the coated surface was cleaned by a feather duster and weighed again to compare the weight before the test. Thus obtained losses in weights are shown in the table as abrasion resistances.
(*5) Burning resistance
Each 0.5 mm thick mild steel sheet was applied with a 50 ± 5 micron thick coating of each silica-polyvinyl alcohol complex. This test piece was held horizontally with the coated surface upside and a Bunsen burner is vertically placed under the test piece with the tip of the burner positioned at 3 cm distance apart. Then, the test piece was heated by the oxidizing flame or town gas and the state of burning of the coating and the crumbling of the coating film around the strongly heated area were observed. In the table, the notations A, B and C mean as follows:
  A: The coating film in the strongly heated area was only carbonized.
  B: Slightly rose up in flames and the crumbling of coating was observed only in the strongly heated area.
  C: Considerable flaming and crumbling of the coating were observed.

EXAMPLES 12 – 17

A mixture of 250 parts by weight of aqueous colloidal silica dispersion Snow Tex-O and 10 parts by weight of vinyl tris($\beta$-methoxyethoxy) silane "KBC 1003" was prepared. Then, 250 parts by weight of polyvinyl alcohol 20% aqueous solution (the same as that in Example 1) was added and maintained for 1 hour at 80° C to obtain a viscous milky white aqueous dispersion of silica-polyvinyl alcohol complex.

To each 100 parts by weight (as solid) of thus prepared silica-polyvinyl alcohol complex was added alkoxide of silicon or titanium, or its complex. The kinds and quantities of the alkoxides or complexes are shown in the following Table 2. Each of thus prepared mixture was applied to the surfaces of steel sheets and tinned iron sheets, and after the evaporation of water content, the coating films were cured by heating for 10 minutes at the temperatures as shown in Table 2.

With regard to these tests plates, the water resistance and flexibility of peeled coating film were tested, the result of which are shown in the following Table 2.

COMPARATIVE EXAMPLE 4

The silica-polyvinyl alcohol complex used in the above Examples 12 to 17 was employed without the addition of any alkoxide.

COMPARATIVE EXAMPLE 5

The alkoxide indicated in Table 2 was added to 250 parts by weight of the same polyvinyl alcohol aqueous solution used in Examples 12 to 17.

In like manner as the above Examples 12 to 17, the materials of Comparative Examples 4 and 5 were also subjected to the tests, the results of which are shown in the following Table 2.

milky white dispersion of silicapolyvinyl alcohol complex having a viscosity of about 4.2 poise (20° C).

Then, 1.6 parts by weight of tetraisopropyl titanate (used in Example 14) was added to 100 parts by weight of the above obtained dispersion of silica-polyvinyl alcohol complex, and this composition was applied to the surfaces of steel sheet and tinned iron sheet to form about 30 micron thick coatings. The coatings were then cured by heating at 180° C for 10 minutes.

These test pieces were subjected to the tests of water resistance and flexibility in like manner as the foregoing Examples 12 to 17, and the results were 240 hours and B, respectively.

EXAMPLE 19

A mixture was prepared by using 100 parts by weight of 12 wt% aqueous solution of polyvinyl alcohol (saponification value: about 86%, number average polymerization degree: about 1500) and 60 parts by weight of aqueous dispersion of colloidal silica Snow Tex 30 (trademark, a product of Nissan Chemical Industries, Ltd.; particle diameter: 10 – 20 m$\mu$; SiO$_2$ content: 30 wt%; pH: 9.5 – 10.5). Further, 4.5 parts by weight of tetraisopropyl titanate (trademark: "TPT-100") was added to the above mixture, and the thus obtained mixture was applied to the surfaces of 0.5 mm thick mild steel sheet and tinned iron sheet to form about 25 micron thick coating films. These coatings were then cured by heating at 180° C for 20 minutes. The obtained test pieces were then subjected to the tests in like manner as the above Examples 12 to 17, and the result in water resistance test was 216 hours and in flexibility test was B.

Table 2

| Example No. | Alkoxide Name | Parts by weight | Film thickness ($\mu$) | Heating temp. (° C) | Water (*1) resistance (hours) | Flexibility (*2) |
|---|---|---|---|---|---|---|
| Example 12 | TBT-100 (*3) | 10 | 30 | 160 | 312 | B |
| Example 13 | TBT-100 | 5 | 30 | 160 | 264 | B |
| Example 14 | TPT-100 (*4) | 8 | 22 | 160 | 288 | B |
| Example 15 | TBT-400 (*5) | 10 | 28 | 180 | 288 | B |
| Example 16 | TBT-chelate (*6) | 10 | 26 | 190 | 288 | A |
| Example 17 | Ethyl silicate 40(*70) | 5 | 24 | 160 | 336 | B |
| Comparative Example 4 | None | 0 | — | 160 | 120 | C |
| Comparative Example 5 | TBT-100 | 10 | 28 | 180 | 36 | A |

Notes for Table 2
(*1) Water resistance: The same as the note (*3) for Table 1.
(*2) Flexibility:
The coating film applied on the tinned sheet iron was peeled off by amalgamating the tin layer with mercury. The peeled coating film was cut into a rectangular form of 40 mm in width and 80 mm in length, the center line in the longitudinal direction of the peeled coating film was then brought into contact with a steel rod having a round section of 1 mm in diameter, and the coating film was quickly bent for 180 degrees on the rod. Thus, the state of damages on the coating film was observed and the results were indicated by the notations A, B and C which means as follows:
A ... No damage was found.
B ... Partially cracked.
C ... Broken.
(*3) TBT-100:
Trademark of tetra-n-butyl titanate made by Nippon Soda Co., Ltd., containing 23.5 wt% of titanium as TiO$_2$.
(*4) TPT-100:
Trademark of tetraisopropyl titanate made by Nippon Soda Co., Ltd., containing 28.6 wt% of titanium as TiO$_2$.
(*5) TBT-400:
Trademark of tetramer of tetra-n-butyl titanate made by Nippon Soda Co., Ltd.
(*6) TBT-chelate:
Chelation product of butyl titanate with diacetone alcohol which was prepared by the process as follows:
58.5 parts by weight of TBT-100 and 41.5 parts by weight of diacetone alcohol were mixed together and held at 50° C for 24 hours while the moisture in the air was excluded. Thus the color of the mixture changed from yellow into dark red and chelated difunctional dibutyl titanate was formed.
(*7) Ethyl silicate 40:
Trademark of tetramer to hexamer of tetraethyl silicate made by Nippon Colcoat Co., Ltd.

EXAMPLE 18

A mixture of 50 parts by weight of aqueous colloidal silica dispersion Snow Tex-O and 50 parts by weight of 20 wt% aqueous solution of polyvinyl alcohol (the same as that in Example 1) was prepared and the mixture was maintained at 80° C for 3 hours to obtain a

EXAMPLES 20 – 33

The same aqueous dispersion of silica-polyvinyl alcohol complex as those used in Examples 12 to 17 was prepared and several water soluble metallic salts were added to respective 100 g (as solid) of the silica-polyvinyl alcohol complex dispersion as shown in the following Tables 3 and 4. The metallic salts were added in the form of solution. The formed coating compositions were applied on steel sheets and tinned iron sheets and cured at 160° C for 10 minutes to obtain the test pieces.

The test pieces were subjected to the tests in like manner as the foregoing Examples and the results are shown in the following Tables 3 and 4.

COMPARATIVE EXAMPLES 6 – 7

For comparison, a mixture of polyvinyl alcohol solution used in Example 1 and cupric chloride solution was prepared as the coating composition for Comparative Example 6, and the same aqueous dispersion of silica-polyvinyl alcohol complex as that in Examples 20 to 33 was used without the addition of metallic salt as the coating composition for Comparative Example 7.

In like manner as the foregoing Examples 20 to 33, these compositions were also subjected to the tests, the results of which are shown in Table 4.

Table 3

| Example No. | Curing Agent Name of compound | Qt. of addition (g) (*1) | Concentration (wt%) | Film thickness ($\mu$) | Water resistance (hours) | Flexibility |
|---|---|---|---|---|---|---|
| Example 20 | Cupric chloride:$CuCl_2$ | 1.5 | 15 | 30 | 180 | B |
| Example 21 | Cupric acetate: $Cu(CH_3COO)_2$ | 5.0 | 5 | 21 | 192 | A |
| Example 22 | Zinc chloride: $ZnCl_2$ | 2.0 | 20 | 29 | 180 | B |
| Example 23 | Zinc lactate:$Zn(C_3H_5O_3)_2$ | 5.0 | 10 | 23 | 228 | A |
| Example 24 | Ammonium aluminum sulfate: $Al_2(SO_4)_3(NH_4)_2SO_4$ | 7.0 | 10 | 21 | 168 | B |
| Example 25 | Aluminum sodium-EDTA: $(EDTA)_3Al_2Na_6$ (*2) | 2.5 | 5 | 24 | 192 | B |
| Example 26 | Zirconyl nitrate: $ZrO(NO_3)_2$ | 1.5 | 5 | 24 | 264 | B |
| Example 27 | Zirconium acetylacetonate $Zr(CH_3COCH_2COCH_3)_4$ | 8.0 | 5 | 19 | 264 | A |

Table 4

| Example No. | Curing Agent Name of compound | Qt. of addition (g) (*1) | Concentration (wt%) | Film thickness ($\mu$) | Water resistance (hours) | Flexibility |
|---|---|---|---|---|---|---|
| Example 28 | Chromium chloride:$CrCl_3$ | 10.0 | 15 | 24 | 168 | B |
| Example 29 | Chromium sodium-NTA: (*3) $(NTA)_3Cr_2Na_3$ | 5.0 | 5 | 22 | 180 | B |
| Example 30 | Cobalt chloride: $CoCl_2$ | 10.0 | 15 | 21 | 168 | B |
| Example 31 | Cobalt acetate: $Co(C_2H_3O_2)_2$ | 5.0 | 5 | 23 | 192 | A |
| Example 32 | Nickel nitrate:$Ni(NO_3)_2$ | 5.0 | 15 | 26 | 180 | B |
| Example 33 | Nickel acetate: $Ni(C_2H_3O_2)_2$ | 2.5 | 5 | 25 | 228 | A |
| Comparative Example 6 | Cupric chloride: $CuCl_2$ | 1.5 | 15 | 25 | 48 | A |
| Comparative Example 7 | None | — | — | 25 | 120 | C |

Notes for Tables 3 and 4
(*1) Qt. of addition:
Weight of the compound as solid excluding water of crystallization which was added to 100 g of the solid content of the silica-polyvinyl alcohol complex.
(*2) EDTA:
Ethlenediaminetetraacetic acid
(*3) NTA:
Nitrilotriacetic acid

EXAMPLES 34 – 38

With the same aqueous dispersion of silica-polyvinyl alcohol complex as in Examples 20 to 33, several coating compositions were prepared by adding inorganic acids and their salts as curing agents which are indicated in the following Table 5. These coating compositions were also subjected to the tests in like manner as the foregoing examples.

The results of the tests are shown in the following Table 5.

Table 5

| Example No | Curing Agent Name of compound | Qt. of addition (g) | Concentration (wt%) | Film thickness ($\mu$) | Water resistance (hours) | Flexibility |
|---|---|---|---|---|---|---|
| Example 34 | Boric acid: $H_3BO_3$ | 5.0 | 5 | 22 | 168 | B |
| Example 35 | Potassium metaborate: $KBO_2$ | 7.0 | 10 | 24 | 168 | B |
| Example 36 | Chromic anhydride:$CrO_3$ | 3.0 | 15 | 28 | 192 | B-C |
| Example 37 | Calcium chromate:$CaCrO_4$ | 5.0 | 15 | 26 | 192 | B |
| | Ammonium bichromate: | | | | | |

Table 5-continued

| Example No | Curing Agent Name of compound | Qt. of addition (g) | Concentration (wt%) | Film thickness (μ) | Water resistance (hours) | Flexibility |
|---|---|---|---|---|---|---|
| Example 38 | (NH$_4$)$_2$Cr$_2$O$_7$ | 3.0 | 10 | 25 | 180 | B-C |

EXAMPLE 39

A 10 % aqueous solution containing 10 g of ammonium bichromate was prepared and this solution was added to the aqueous dispersion of silica-polyvinyl alcohol complex as used in the foregoing Examples 34 to 38 which contained 100 g (as solid) of the complex. Thereby, a photo-curable coating composition was prepared.

The above coating composition was diluted with water and applied to one surface of a sandblasted aluminum sheet using a rotary coater. Then, the water content in the coating was evaporated to form a 3 micron thick photo-sensitive layer on the aluminum sheet. Thus, a lithographic plate material was produced.

A negative film was brought into contact with this printing plate and ultraviolet rays were applied for 2 minutes by using a 3 KW ultra-high pressure mercury lamp placed 50 cm distance apart. After this exposure, the photo-sensitive layer in non-image areas was washed off with warm waer and the plate was dried to obtain a lighographic plate. This printing plate was used for photo-offset printing and it was understood that more than 30,000 clear prints can be successfully obtained.

What is claimed is:

1. A hardenable coating composition which comprises an aqueous dispersion of silica-polyvinyl alcohol complex obtainable by the reaction between a dispersion of colloidal silica and a solution of polyvinyl alcohol at a temperature above 50° C.

2. A hardenable coating composition as claimed in claim 1 in which the average particle diameter of said colloidal silica is 7 to 100 millimicrons.

3. A hardenable coating composition as claimed in claim 1 in which the compounding ratio of said colloidal silica/polyvinyl alcohol as solid for the preparation of said silica-polyvinyl alcohol complex is in the range of 25/75 to 75/25 by weight.

4. A hardenable coating composition as claimed in claim 1 in which at least one reaction accelerator selected from the group consisting of water soluble dialkoxy-, trialkoxy-, dialkoxyalkoxy-, and trialkoxyalkoxy silanes was added to said dispersion of colloidal silica or solution of polyvinyl alcohol or their mixture.

5. A hardenable coating composition as claimed in claim 4 in which 1 to 15% by weight of said reaction acelerator is added to the total weight as solid of both silica and polyvinyl alcohol contents.

6. A hardenable coating composition as claimed in claim 1 additionally containing at least one curing agent selected from the group consisting of alkoxide of the group IV elements of the periodic table or their complexes, water soluble salt of copper, zinc, aluminum, zirconium, chromium, cobalt and nickel or their coordination compounds, boric acid, water soluble borates, chromic acid, water soluble chromates and water soluble bichromates.

7. A hardenable coating composition as claimed in claim 6 in which 3 to 20% by weight on solid content basis of said alkoxide of the group IV element or its complex was added to said coating composition.

8. A hardenable coating composition as claimed in claim 6 in which 1 to 10% by weight on solid content basis of said metallic salt or its coordination compound, or said inorganic acid or its salt was added to said coating composition.

9. A hardenable coating composition as claimed in claim 1 in which the average particle diameter of said colloidal silica is 10 to 50 millimicrons.

10. A hardenable coating composition as claimed in claim 1 in which the compounding ratio of said colloidal silica/polyvinyl alcohol as solid for the preparation of said silica-polyvinyl alcohol complex is in the range of 40/60 to 70/30 by weight.

11. A hardenable coating composition as claimed in claim 1 wherein said temperature is 70°–90° C.

12. A hardenable coating composition as claimed in claim 11 wherein the average particle diameter of said collidal silica is 10–15 millimicrons, and wherein the compounding ratio of said colloidal silica/polyvinyl alcohol as solid for the preparation of said silica-polyvinyl alcohol complex is in the range of 40/60 to 70/30 by weight.

* * * * *